(No Model.) 2 Sheets—Sheet 1.

E. THOMSON.
ELECTRIC METER.

No. 401,803. Patented Apr. 23, 1889.

Witnesses.
Ira R. Steward.
Fred H. Capel.

Inventor
Elihu Thomson
By his Attorney
H. C. Townsend

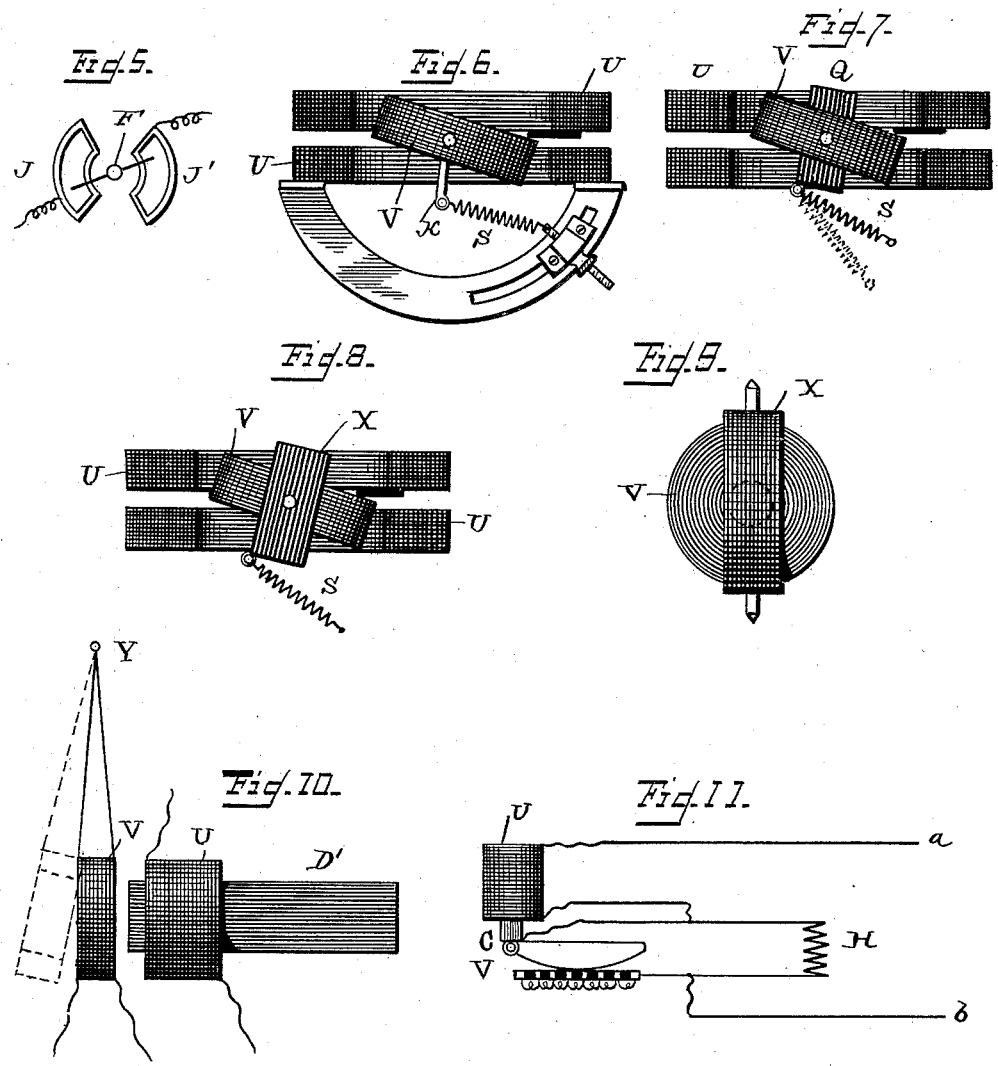

UNITED STATES PATENT OFFICE.

ELIHU THOMSON, OF LYNN, MASSACHUSETTS.

ELECTRIC METER.

SPECIFICATION forming part of Letters Patent No. 401,803, dated April 23, 1889.

Application filed December 7, 1888. Serial No. 292,872. (No model.)

*To all whom it may concern:*

Be it known that I, ELIHU THOMSON, a citizen of the United States, and a resident of Lynn, in the county of Essex and State of Massachusetts, have invented a certain new and useful Improved Electric Meter, of which the following is a specification.

My invention relates to translating devices in which the extent or amount of effects or actions is dependent upon the flow of current in the same, and is ordinarily proportional to the square of such current, as in the case of a device which is operated by heat developed by an electric current, when, as is well known, the heat is proportional to the square of the current.

The object of my invention is to provide a compensation or correction for the difference in proportions of currents flowing and effects or actions produced, and to secure in the translating device effects or actions directly proportional to the currents flowing on a circuit or portion of circuit.

My invention is especially applicable to the case of electric meters operated by the heating effects of electric currents.

My invention consists of the method of obtaining, in an electric translating device, actions or effects in direct proportion to the current flowing in another circuit or portion of the circuit, consisting in admitting current to said translating device in proportion to the square root of the current in such circuit. Thus, for instance, in the case of an electric meter operated by the heating effects of the electric current to be measured, or of a current proportional to the current to be measured, I would secure an accurate proportional registry by causing the heating-current to flow in the heating-conductor of the meter in proportion not to the amount of current in a circuit to be measured, but to the square root of the current passing on such circuit as near as may be within the limits of mechanical errors. Thus, for instance, if the translating device were responsive to the heat evolved by the electric current, and were used for measuring the number of incandescent lamps in use, the governing device would cause current to flow in the translating device in amount not proportional to the number of standard lamps, but proportional to the square root of the number of standard lamps, or to the square root of the current passing in the lamps used at any one time.

Figure 1:
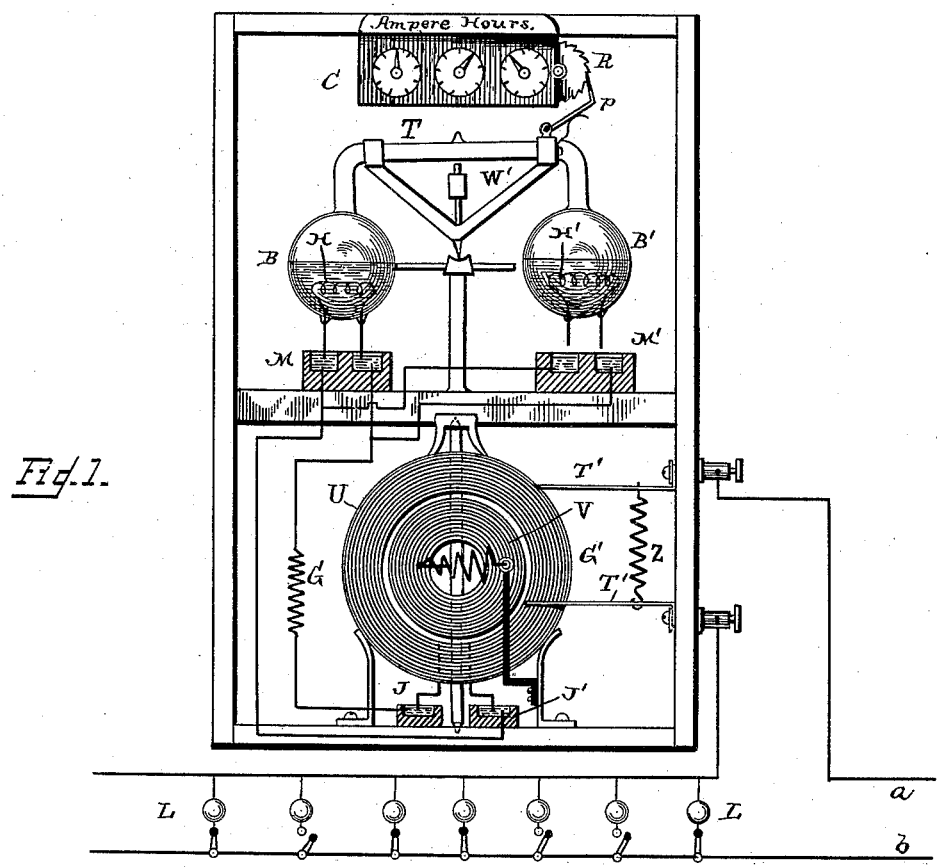
Figure 2:
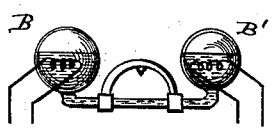
Figure 3:
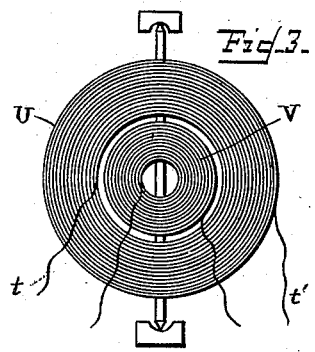
Figure 4:
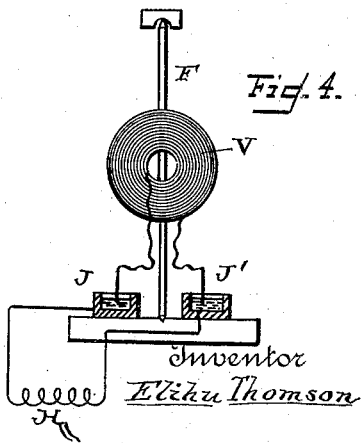

In the accompanying drawings, Figure 1 is an elevation of an apparatus in which my invention is embodied for the purpose of measuring the current supplied to a group of incandescent electric lamps, and in which suitable compensation in accordance with my invention is made for the error which would be due to the fact that the heating effect on the portion of the meter affected by the heat of the current is proportional, under the well-known law, to the square of the current. Fig. 2 shows a modification of a part of the meter. Figs. 3 and 4 show in elevation forms of compensating device or current-governor adapted for use in accordance with my invention. Fig. 5 shows in plan a part of the devices used for conveying current from said governor. Fig. 6 is a horizontal cross-section of the governor. Figs. 7, 8, 9, and 10 illustrate in cross-section and elevation other forms of current governor or compensator in which electrical or magnetic induction is applied. Fig. 11 shows in side elevation another form of current-governor adapted for use when my invention is employed on continuous-current circuits.

In Fig. 1 I have shown my invention as applied to a form of electric meter which is the subject of an application for patent filed by me October 19, 1887, Serial No. 252,793.

In Fig. 1, B and B' are bulbs of glass or other suitable material connected together by a tube or passage, T, and mounted so as to be capable of oscillation. They are filled with alcohol or other like vaporizable fluid which has been well boiled in the bulbs and sealed while vapor was escaping, so producing in the bulbs an alcohol-vacuum or a space filled with alcohol vapor at the tension due to its temperature, no air being present, or very little. In the bulbs B B', or adjacent thereto, are placed small coils or other form of conductors, of German silver or other material, connected by wires sealed through the glass of the bulbs. The coils in the bulbs are preferably of low resistance. While current flows in either coil, so as to heat the same, a continued evaporation of the alcohol in the bulb with it takes place, and the alcohol vapor is forced over into and condenses in the other bulb, thus adding to the amount of liquid in the latter and subtracting liquid from the bulb containing the heated alcohol. By means of an electric switch operated by such bulbs an automatic transfer of current takes place from coil H to H' and back again upon a given evaporation taking place from one or other bulb, B B', to the other. To this end the center of gravity of the system is made so that it shall always be at a higher point than produces stable equilibrium—that is, so that with an equal amount of weight in each bulb the structure will only rest in inclined positions at either side. To produce a definite amount of this overbalancing, or "oversetting," as it is termed, a weight, W', may be provided, sliding up and down on a vertical rod above the suspension-edges and affixed in any desired position. As the bulbs tip from side to side, the wires extending from the bottom of each bulb alternately dip in their respective mercury-cups M M', so as to complete the circuit from J J' or any source of current through one or the other heating-coil, H H', as the case may be. During passage of current from J to J' the structure so constituted will intermittently tip back and forth. This oscillation can be given a definite value by providing suitable stops limiting the play of the bulbs and by giving the bulbs a definite oversetting. As a type of any registry mechanism, counting or recording the movements of or otherwise actuated or affected to a definite degree by each swing of the bulbs B B', an ordinary ratchet-and-pawl counter is shown at C, so that each throw of the bulbs may be registered. Any other registering mechanism might take the place of C. The pawl $p$, connected to the oscillating structure, operates on a wheel, R, of the register-train.

Instead of having the liquid evaporated from one bulb to the other, as in Fig. 1, the device might be inverted, so that the evaporation in one bulb, Fig. 2, would drive the liquid through the tube to the other, and vice versa.

It is obvious that in the device described the effect is to produce an evaporation which is as the square of the current in the coil, because the heating effect is as the square of the current and is proportional to the time of flow. The effect desired is, however, one proportional not to the square of the current, but (in the case of a meter) to the current itself which is to be measured; and to obtain a correction in this respect, so as to produce a registry in direct proportion to the current flowing on a circuit or portion of circuit, is one of the objects of my invention. This correction I attain by passing or permitting currents to pass through the meter in direct proportion to the square roots of the currents in the circuit of the lamps or other circuit, so that whether one lamp or a dozen be in use the record shall be true. One way of doing this with a fair approximation in the case of alternating currents is to supply the meter from the secondary of a transformer whose primary connects with the circuit carrying current the same as or proportional to the current to be measured, and to mount or arrange the coils of the transformer so that their inductive relation may change or be changed through their mutual reaction or by other means.

Several forms of apparatus suitable for the purpose will now be described.

In Fig. 3, U is a fixed coil or coils placed in the circuit with the lamps used by its terminals $t$ $t'$. Mounted on a vertically-pivoted shaft delicately poised is a second coil, V, or coils whose terminals are carried through J J' to the heating-coils H or H' of the preceding figures. The coil V is, however, capable of rotation on its vertical axis F, Fig. 4, mounted in suitable jewels, and to avoid friction its terminals dip in mercury-cups J J', Figs. 4 and 5, from which cups connection is made. A suitable delicate spring, S, (shown in Fig. 6,) adjustable as to its fixed extremity both in position and elasticity, is selected and attached to an arm, K, extending, as shown, from the coil V or its supporting-axis. The spring S is wound conically, or thereabout, and is of very light wire, and is adjusted to pull in such direction, and its elastic force is made such that alternating currents in coils U will, when coil V is circuited through H, Fig. 4, cause deflection of V from the position shown in Fig. 6 to the position at which its plane approaches a right angle with that of coils U U, and at the same time that the current induced in coil V by those in U shall be as the square roots of said currents in U. This condition I find to be attainable with tolerable approximation to accuracy by suitably proportioning the restraining influences governing the motion of the coil V under the deflective actions exerted.

The coil V may, as in Fig. 7, have a small core or bundle of iron wire or sheet strips, Q, carried with it, and it will then require less elastic force of the spring S to be exerted upon it in its deflected positions, because the core Q will tend to return the coil V to restrain its deflection, for said core will tend to place itself axially with respect to coil V. The precaution must be taken to have the coil Q quite short and rather small, as otherwise its effect in restraining deflection of V may be excessive.

Figs. 8 and 9 show another way of restraining the deflection of V, which consists in providing a closed band or circuit, X, forming an angle with V, which angle may be made of varying amounts, as needed. If the plane of X be about forty-five degrees angle with that of V, or a little greater than this, it will suffice. The tendency of X is to stand at right angles with the plane of U U, and it acts, therefore, in much the same sense as the core Q. Care must be taken, however, that closed band or conductor X be not too large or powerful in its effects.

The object is to so adjust the parts and their relations of size and effect that the currents induced in coil V by currents in U U shall always be in proportion, so far as can readily be attained, to the square roots of the currents in U U. If the coil V did not deflect, the currents in it would be in direct proportion to those in U U. The deflection of V, however, causes the desired diminution.

While I have described the coil V as the movable one, it will be evident that the coils V and U are interchangeable in their relations so far as movability of either is concerned. If the coil V be hung, as in Fig. 10, in front of a coil, U, and core D' affected by the lamp-current, the current in U will not induce currents in V proportional to those in U; but an approximation to the effects obtainable with Figs. 3 to 8 is possible. The suspension at Y must be delicate and at a considerable distance above the coil V.

In Fig. 11 I have shown another device that may be used for securing a compensation or correction by modifying the currents permitted to flow to the translating device—such as a meter—in accordance with my invention. This device is suited for use in continuous-current circuits. A variable shunt, V, or other means of controlling the flow of current to the translating device—as, for instance, the heating-coil H—is employed. The variable shunt may be operated by a solenoid-core, C, or other device responsive to the flow of current in the circuit. The arrangement is so proportioned that increments of current in U will vary the shunt at V, or the resistance at V in shunt to H, in such way that H shall receive only the square roots of the currents in the circuit. The variations are, however, not so smooth and delicate as they are with alternating currents in the devices before described.

The application of the devices to a meter is illustrated in Fig. 1.

A variable resistance, or resistance whose amount can be set or varied, may be added as a shunt around the coil U, as in Fig. 1, to standardize the readings of the meter. The connections from $a$ to $b$ (the supply-wires) to the lamps L L are shown. The apparatus so organized will register in proportion to lights used and the time of use.

While I have described my invention as carried out in connection with an electric meter, it will be readily understood that the same method might be applied to other translating devices where a compensation or correction such as set forth is desired. It will be also readily understood that the same method might be carried out by the use of any devices which will produce a modification in the flow of currents to the meter or translating device in accordance with the principle stated.

Part of the apparatus herein described as suitable for use in practicing the method forming the subject of the present application is claimed in my prior application filed October 19, 1887, Serial No. 252,793.

What I claim as my invention is—

1. The herein-described method of obtaining, in an electric translating device, actions or effects in direct proportion to the current flowing in another circuit or portion of the circuit, consisting in admitting current to said translating device in proportion to the square root of the current in such circuit.

2. The herein-described method of obtaining, in an electric meter operated by heating effects of an electric current, indications in direct proportion to the currents to be measured, consisting in admitting current to the meter in proportion to the square roots of such currents.

3. In an electric translating device in which actions or effects are the direct result of the flow of electric current, the herein-described method of obtaining an action or effect in direct proportion to the flow of current on another circuit or portion of the circuit, consisting in admitting current to the translating device in proportion to the square root of the current on such other circuit or portion of circuit.

Signed at Lynn, in the county of Essex and State of Massachusetts, this 3d day of December, A. D. 1888.

ELIHU THOMSON.

Witnesses:
J. W. GIBBONEY,
W. S. HADAWAY, Jr.